UNITED STATES PATENT OFFICE.

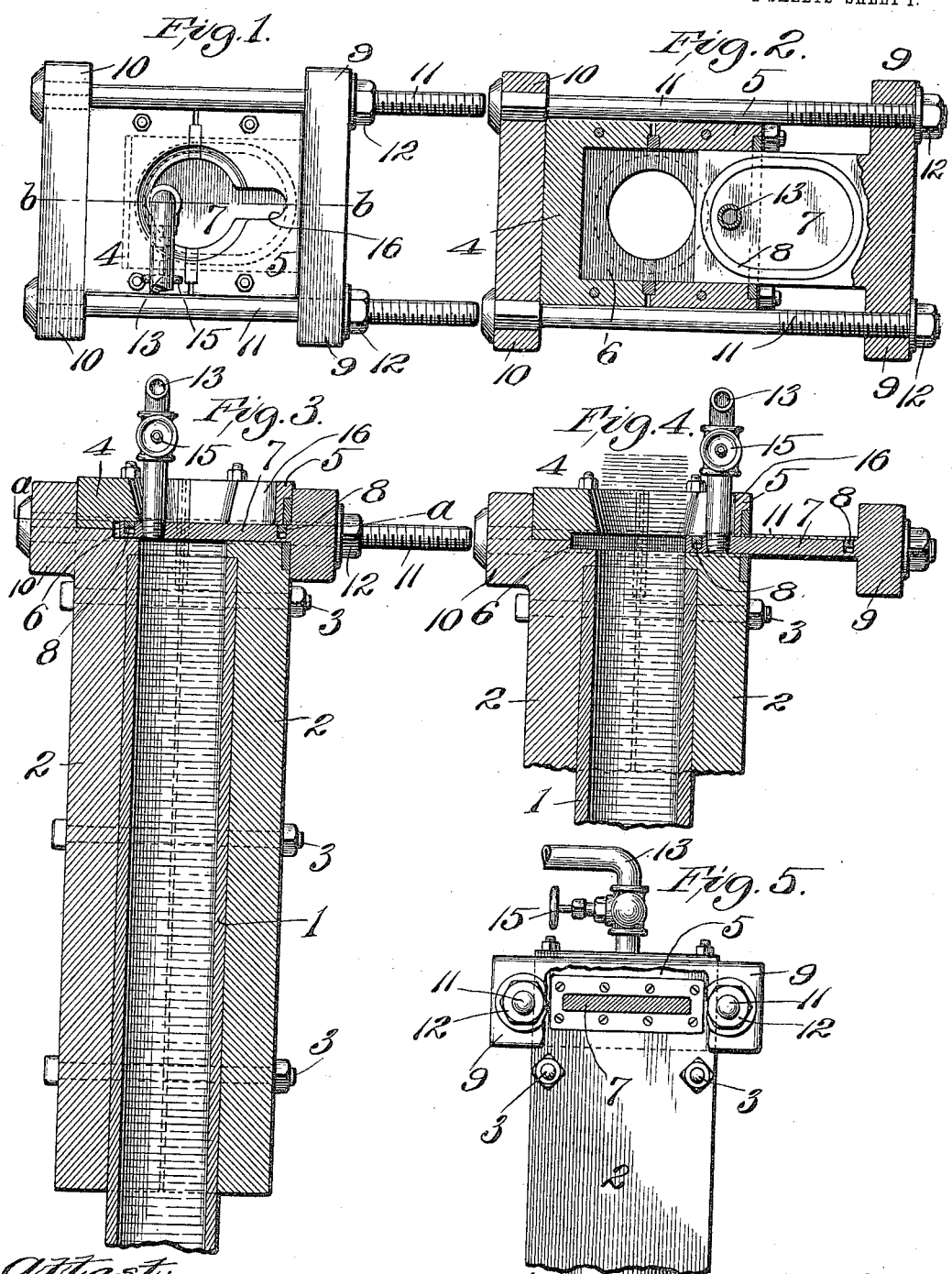

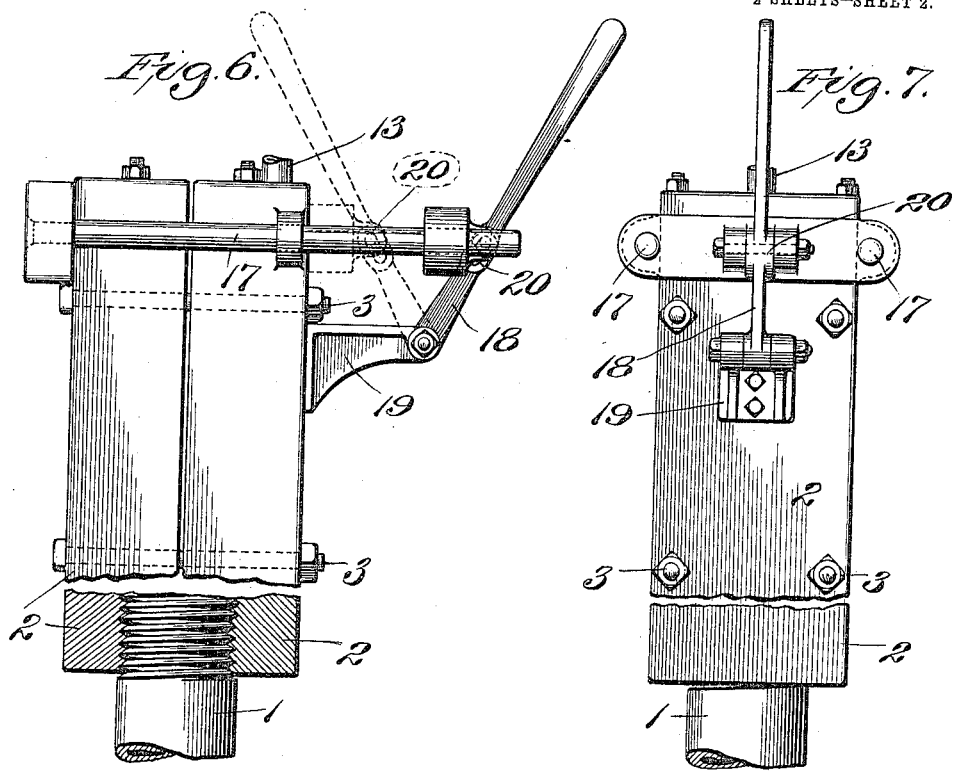
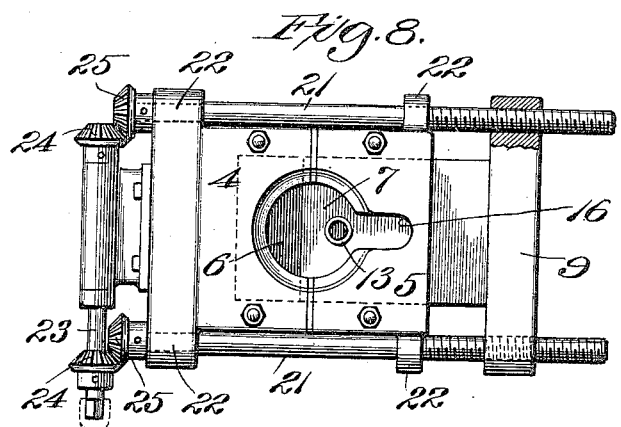

LOUIS HARMS, OF GRAND JUNCTION, COLORADO.

VALVE.

994,078.

Specification of Letters Patent.   Patented May 30, 1911.

Application filed September 19, 1910.   Serial No. 582,672.

*To all whom it may concern:*

Be it known that I, LOUIS HARMS, a citizen of the United States, residing at Grand Junction, in the county of Mesa and State of Colorado, have invented a new and useful Valve, of which the following is a description.

This invention relates to valves, and the object is to provide a valve which is operable to regulate the flow of liquids under pressure, and which is provided with another suitably controlled outlet or faucet through which the liquid may be emitted even while the valve is closed.

Other objects, as well as many advantages, will appear from the following description, reference being made to the accompanying drawing in which I have illustrated one embodiment of my invention, and in which—

Figure 1 is an end elevation of the valve in connection with a pipe. Fig. 2 is a sectional view taken approximately on a line $a$—$a$ of Fig. 3. Fig. 3 is a longitudinal sectional view on a line $b$—$b$ of Fig. 1, the valve being in closed adjustment. Fig. 4 is a similar sectional view showing the valve in open adjustment. Fig. 5 is a side elevation, partially in section, showing the form and arrangement of the valve gate. Fig. 6 is a side elevation of the invention with a lever for operating and controlling the valve gate. Fig. 7 is another side elevation of the embodiment shown in Fig. 6. Fig. 8 is an end elevation of the valve, illustrating another form of device for controlling the valve gate.

Similar reference characters indicate like parts in the different views of the drawings, the numeral 1 indicating the pipe to which the valve is connected.

In the embodiment shown the valve includes two clamp members 2 which are adapted to embrace the end of the pipe 1 through which the liquid is drawn or passes. The clamp thus formed may be fastened on the pipe by any convenient fastening elements, such as bolts, shown at 3. To the end of one of the members 2 a block 4 is secured, and a block 5 is secured to the end of the other of said members. These blocks constitute, practically, extensions of the two clamp members, and their adjacent edges are cut out to form a hole or opening which registers with the outlet from the pipe 1, and which enlarges outwardly as shown in Figs. 3 and 4. Kerfs or recesses 6 are formed in the abutting sides of the members 2 and blocks 4 and 5, and a valve gate 7 is slidably mounted in the space or seat formed by said kerfs or recesses. Packing 8 is arranged in an oval channel in one side of the valve gate 7 so as to form a close joint and prevent leakage of the fluid in the pipe. In the embodiment shown the outer edge of the gate 7 is provided with laterally-extending projections 9 which have holes therein. The opposite clamp member 2 also has laterally-extending arms 10 having holes therein. Bolts or threaded rods 11 extend through the holes in the arms 10 and project for considerable distance through the holes in the arms 9. The nuts 12 on the projecting threaded ends of these bolts or rods are operable effectively to bind the valve gate 7 in closed adjustment as shown in Figs. 1 and 3; or to release and permit said valve gate to be opened, as shown in Figs. 2 and 4. The bolts or rods are of sufficient length to hold the nuts 12 while the valve gate is open, so as to prevent loss of any of the parts which might occur were they detached at any time in operating or using the device.

The valve gate carries a faucet or outlet passage 13 controlled by a suitable valve 15 whereby liquid may be drawn off in the quantity desired even while the valve gate 7 is closed. This faucet or passage is moved by the valve gate whenever the latter is moved, the block 5 having a recess 16 (Figs. 1 and 4) into which said faucet or outlet moves when the valve gate is opened.

In the modified embodiment shown in Figs. 6 and 7, the rods 17 are similar to the bolts or rods 11, except that said rods 17 are devoid of threads. A lever 18 is pivoted upon a bracket 19 on one of the clamp members 2, and has pin-and-slot connection, as shown at 20, with the outer edge of the valve gate 7. This lever, arranged in the manner shown, or in any equivalent arrangement, constitutes convenient manipulative means for operating the valve gate in opening and closing the same.

In the form shown in Fig. 8 the elements 21 are threaded shafts journaled in bearings 22 on the clamp members, and are screwed into holes in the arms 9 of the valve gate. Simultaneous rotation of the shafts 21 will slide the valve gate 7 to any desired adjustment, and for effecting such simultaneous rotation of said shafts I provide, preferably, a shaft 23 having bevel pinions 24 which are enmeshed with similar pinions 25 on the ends of the shafts 21. For rotating said shaft 23 any suitable device, such, for instance, as a crank 26, may be used.

To prevent the pressure of the fluid from detaching the valve mechanism the pipe 1 and clamp members 2 are, preferably, provided with engaging threads. This arrangement, also, will facilitate the adjustment of the clamps in proper position on the pipe, since it would enable the clamps to be screwed to any desired position on the pipe before the final tightening of the clamps. The threaded arrangement is shown in Fig. 6, it being unnecessary to illustrate this feature in each separate view of the drawing.

Many other embodiments will suggest themselves after reading this description. I do not restrict myself to details of construction and arrangement since various modifications may be made without the slightest departure from the spirit and scope of the invention.

What I claim and desire to secure by Letters Patent is—

1. The combination with a pipe of a valve comprising two clamp members clamped on said pipe, parallel rods supported by said clamp members, a block attached to said clamp members, a valve gate slidably mounted between said block and clamp members, projections on said valve gate having holes through which said rods project, and binding means on said rods for holding said valve gate in closed adjustment, substantially as specified.

2. A valve comprising a support composed of clamp members threaded interiorly and adapted to engage with a pipe, a valve seat in said support, a valve gate, means for operating said valve gate, a pipe of relative small diameter with respect to the pipe engaged by said valve support, and a valve in said last named pipe, substantially as specified.

3. The combination with a pipe of a valve comprising two clamp members clamped on said pipe parallel rods supported by said clamp members, a block attached to said clamp members, a valve gate slidably mounted between said blocks and said clamp members, a valve controlled outlet passage in said valve gate, projections on said valve gate having holes through which said rods project, and means on said rods for opening and closing said valve gate, substantially as specified.

4. The combination with a pipe of interiorly threaded clamp members, bolts passing through said clamp members, constituting means for clamping said members on the pipe, blocks secured to said clamp members, a valve gate slidably mounted between said clamp members and said blocks, a channel in said valve gate adapted to receive a sealing element, an outlet passage in said valve gate, laterally extending projections on the outer side of said valve gate, arms on said clamp members, registering sets of holes in said projections and said arms, bolts passing through said holes, constituting means for opening and closing said valve gate, all substantially as shown and described.

5. The combination with a pipe; of clamp members engaging with said pipe; a block member secured to each of said clamp members, the adjacent edges thereof cut out effectively to form an opening, the smaller end of which registers with the outlet of said pipe and enlarges outwardly; a valve gate slidably mounted between said clamp members and said block members; means for operating said valve gate, and a valve controlled outlet passage in said valve gate, substantially as described.

6. The combination with a pipe; of clamp members engaging with said pipe; a block member secured to each of said clamp members, the adjacent edges thereof cut effectively to form an opening enlarging outwardly, and the smaller end of which registers with the said pipe; a valve gate slidably mounted between said clamp members and said block members, and means for operating said valve gate, substantially as specified.

In testimony whereof I have signed this specification this 31st day of August, 1910, in the presence of two witnesses.

LOUIS HARMS. [L. S.]

In presence of—
 EVELYN PERKINS,
 GEORGE BULLOCK.

---

Copies of this patent may be obtained for five cents each, by addressing the "Commissioner of Patents, Washington, D. C."